United States Patent [19]

Marlevi et al.

[11] Patent Number: 5,572,221

[45] Date of Patent: Nov. 5, 1996

[54] METHOD AND APPARATUS FOR DETECTING AND PREDICTING MOTION OF MOBILE TERMINALS

[75] Inventors: Alexander Marlevi, Spånga; Anders Danne; George Liu, both of Kista, all of Sweden

[73] Assignee: Telefonaktiebolaget LM Ericsson, Stockholm, Sweden

[21] Appl. No.: 329,608

[22] Filed: Oct. 26, 1994

[51] Int. Cl.$^6$ .................................................. G01S 3/02
[52] U.S. Cl. ........................................ 342/452; 455/56.1
[58] Field of Search ........................... 364/449; 342/457, 342/357; 455/12.1, 33.2, 56.1; 379/59, 60

[56] References Cited

U.S. PATENT DOCUMENTS

| | | |
|---|---|---|
| 5,175,867 | 12/1992 | Wejke et al. . |
| 5,307,278 | 4/1994 | Hermans et al. ............ 364/450 |
| 5,353,332 | 10/1994 | Raith et al. . |
| 5,430,657 | 7/1995 | Kyrtsos ....................... 364/459 |
| 5,448,487 | 9/1995 | Arai ............................ 364/449 |

FOREIGN PATENT DOCUMENTS

| | | |
|---|---|---|
| 421698 | 4/1991 | European Pat. Off. . |
| 4324531 | 12/1994 | Germany . |
| WO95/03598 | 2/1995 | WIPO . |

OTHER PUBLICATIONS

D. J. Lilja, "Cache Coherence in Large–Scale Shared–Memory Multiprocessors: Issue and Comparisons", *ACM Computing Surveys*, vol. 25, No. 3, pp. 303–338, (Sep. 1993).

C. D. Tait et al., "Detection and Exploitation of File Working Sets", Computer Science Department, Columbia University, Tech. Rpt. CUCS–050–90, pp. 1–19.

L. Söderberg, "Evolving an Intelligent Architecture for Personal Telecommunication", *Ericsson Review*, vol. 70, No. 4, pp. 156–171 (1993).

S. Chia, "Mixed Cell Architecture and Handover", *IEEE Colloquium on Mobile Communications for the Year 2000*, (Jun. 8, 1992).

G. Liu, "Exploitation of Location–dependent Caching and Prefetching Techniques for Supporting Mobile Computing and Communications", *6th International Conference on Wireless Communications*, Canada, pp. 1–6 (Jul. 11–13, 1994).

*Primary Examiner*—Thomas H. Tarcza
*Assistant Examiner*—Dao L. Phan
*Attorney, Agent, or Firm*—Burns, Doane, Swecker & Mathis, LLP

[57] ABSTRACT

Methods and apparatus for detecting and predicting movement patterns of mobile radio transceivers, such as mobile cellular telephones, enhance the performance of hierarchical radio networks, in which network structures, such as different cells, have different communication bandwidths. One method of predicting a next location of a mobile terminal based on stored previous locations of the mobile terminal includes the step of comparing a current sequence that includes the current location of the mobile terminal and a plurality of previous locations of the mobile terminal to each of a plurality of stored sequences that each include previous locations of the mobile terminal. The method also includes the steps of selecting one of the stored sequences based on at least one quantitative measure of a degree of matching between the current sequence and each stored sequence, and predicting the next location of the mobile terminal based on the selected one of the stored sequences. Methods and apparatus for determining regular patterns in movements of a mobile terminal are also described, as is a communication network having a plurality of servers, the servers being positioned in respective geographical areas and organized in a distributed file system; a mobile terminal having a device for communicating with the server nearest the mobile terminal, the communicating device accessing application files and data files stored in the servers; and a mobile distributed system platform having a device for controlling the distributed file system of the servers and a device for predicting a next location of a mobile terminal, the controlling device distributing location sensitive information among the servers based on a next location predicted by the predicting device.

35 Claims, 11 Drawing Sheets

Fig. 5
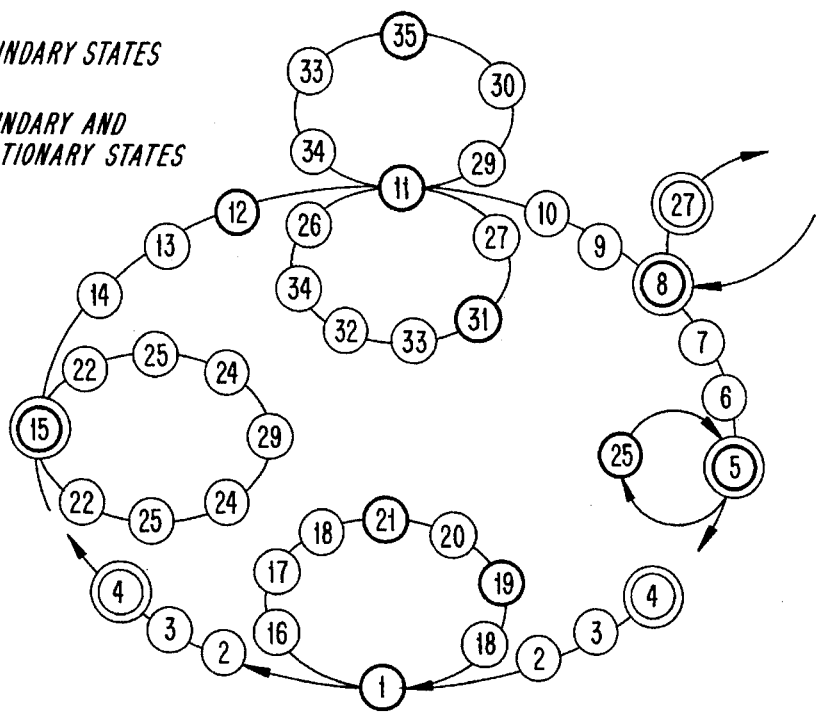
○ TRANSITIONAL STATES
◯ STATIONARY STATES
◉ BOUNDARY STATES
◎ BOUNDARY AND STATIONARY STATES
Fig. 6
○ TRANSITIONAL STATES   ◯ STATIONARY STATES   ◉ BOUNDARY STATES
◎ BOUNDARY AND STATIONARY STATES
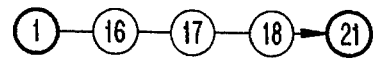
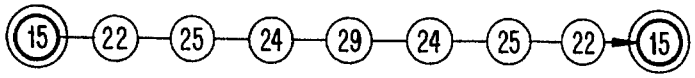
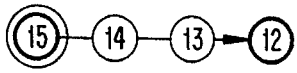
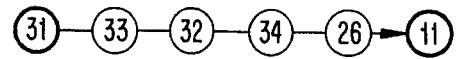
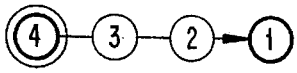

METHOD AND APPARATUS FOR DETECTING AND PREDICTING MOTION OF MOBILE TERMINALS

BACKGROUND

Applicants' invention relates to systems and methods for predicting movements of mobile radio transceivers, such as mobile cellular telephones.

A fundamental shift is occurring that is moving mobile communication and computing together into one synergistic activity—mobile computing—a new dimension in mobile communication networks. Future mobile communication systems will support electronic mail, database and file accessing services, and multimedia services in addition to ordinary voice communication.

Due to non-uniform traffic patterns of mobile terminals in different geographical areas, a layered, or hierarchical, cell architecture is a promising solution for future mobile communication systems. In general, a hierarchical cell structure comprises orthogonal cell layers of different cell types/sizes, covering a common geographical area. A hierarchical cell structure is commonly made up of macrocells overlying microcells and picocells, which are distinguished by their spatial extent, among other characteristics. For example, a picocell is an area having a number of channel groups or an identical code, and the nominal cell radius of a picocell is often less than 200 meters. In a layered communication system, the communication bandwidth of a picocell, which is commonly indoors, can be up to 2–10 megabits per second (Mb/s), while the communication bandwidth of a macrocell is on the order of 10–100 kilobits per second (Kb/s).

Nevertheless, many challenging issues must be solved to support user-transparent, continuous communication for both speech and data across the boundaries of the different cell layers. The connectivity and configuration of such wireless networks is highly dynamic because the mobile terminals can change positions and their radio environments can change at any time. Also, due to the large differences in bandwidth between the cell layers, the communication networks currently available are not transparent for mobile data users. Conventional data caching and prefetching techniques are not efficient in this environment.

Caching and prefetching are commonly used for improving system performance in large-scale distributed computing systems. Measurements indicate that even small caches provide substantial benefits. Caches not only can reduce latency but also can greatly reduce the volume of network traffic as well as the number of server utilizations in a client-server system. Prefetching is complementary to caching, and successful prefetching of data to the local cache will increase the cache hit-rate, i.e., how frequently requested data is found in the cache.

The idea of using caches to reduce latency and network traffic is based on the properties of temporal locality of data accessing patterns of computer programs. This is described in D. Lilja, "Cache Coherence in Large-Scale Shared-Memory Multiprocessors: Issues and Comparisons," *ACM Computing Surveys* vol. 25, no. 3, pp. 303–338 (Sept. 1993). Temporal locality means that data recently accessed by a program are likely to be accessed again in the near future. Thus, a local copy, or cache, of the remote data that have recently been accessed is maintained so that repeated accesses to the same data can be handled locally without additional network traffic. With a well-managed cache, a substantial amount of remote data can be accessed with virtually the same efficiency as local data.

On the other hand, the existence of the multiple copies of shared data introduces a problem of maintaining consistency of the copies that is discussed in the above-cited Lilja publication. When cached data are modified, the changes must be effected in all copies, local and remote, of that data. Various cache coherence schemes can be used to keep the copies consistent according to the data sharing semantics used, but maintaining cache consistency in distributed systems is a very complicated problem involving a tactical balance between consistency, transparency, and network traffic volume.

Prefetching is another useful technique in distributed computing systems that uses knowledge about expected needs for remote data. The remote data is prefetched to a client, viz., fetched before the remote data are actually requested. The knowledge of expected needs can be determined from the client's past behavior. For example, working-sets of files are often prefetched in distributed file systems, and the working-sets are determined based on knowledge of the client's file access pattern. Another common prefetch method uses spatial locality, which refers to the high probability that a client will need data stored at addresses or pages that are neighbors of data already needed.

Current networks are not efficient in wireless data accessing in that they do not support data and service mobility. While users and terminals are mobile, their data is still configured statically in the system. Traditionally, personal/terminal mobility management included passive functions for keeping track of the locations of the users/terminals and for maintaining connections to the terminals belonging to the system.

Also, due to the large differences in data communication bandwidth between cell layers, the communication system is not transparent for mobile data users. In other words, different cell layers have large differences in performance for mobile data users. Conventional cache and prefetch management techniques are mainly designed for fixed data communication networks, and are inefficient in a communication environment, such as a cellular radiotelephone system, in which the communication channels are unpredictable and highly variable with time and location.

The issue is how to improve network performance in a hierarchical cell system, and especially how to make network utilization and management more intelligent in balancing network traffic and dynamic channel allocation, how to make intelligent data caching and prefetching management in the mobile environment, and how to provide efficiently wireless data access.

Accordingly, techniques that can predict the motion (or itinerary) of a mobile terminal user are needed for supporting connection handovers, or handoffs, between the different cell layers with high integrity.

SUMMARY

These problems are solved by Applicants' invention, which provides methods and apparatus for predicting movements of mobile radio transceivers. In this way, Applicants' invention achieves the important objects of improving performance of a hierarchical communication network, improving network utilization and management in balancing network traffic and dynamic channel allocation, and improving data caching and prefetching in a cellular mobile communication network.

In one aspect of Applicants' invention, a method of predicting a next location of a mobile terminal based on stored previous locations of the mobile terminal includes the step of comparing a current sequence that includes the current location of the mobile terminal and a plurality of previous locations of the mobile terminal to each of a plurality of stored sequences that each include previous locations of the mobile terminal. The method also includes the steps of selecting one of the stored sequences based on at least one quantitative measure of a degree of matching between the current sequence and each stored sequence, and predicting the next location of the mobile terminal based on the selected one of the stored sequences.

In another aspect of Applicants' invention, a method of predicting movements of a mobile terminal includes the steps of (a) comparing a current sequence that includes the current location of the mobile terminal and a plurality of previous locations of the mobile terminal to each of a plurality of stored sequences that each include previous locations of the mobile terminal; (b) determining at least one quantitative measure of a degree of matching between the current sequence and each stored sequence; and (c) if the at least one quantitative measure exceeds a predetermined value, using the locations of the respective stored sequence as predictions of the movements of the mobile terminal.

In another aspect of Applicants' invention, a method of determining regular patterns in movements of a mobile terminal includes the step of comparing a current location of the mobile terminal to each of a plurality of previous locations stored in a queue of a plurality of previous locations, the previous locations being stored in the queue in first-in-first-out order of occurrence. The method also includes marking a sequence of locations comprising the current state, the previous location that matches the current location, and the previous locations that occurred after the previous location that matches the current location, if the current location matches one of the plurality of previous locations stored in the queue. The method also includes comparing the marked sequence to each of a plurality of stored sequences of locations and determining at least one quantitative measure of a degree of matching between the marked sequence and each stored sequence, and increasing a priority parameter of the respective stored sequence by a predetermined amount if the at least one quantitative measure exceeds a predetermined value.

Such a method may further include the steps of storing the current location of the mobile terminal in the queue in first-in-first-out order of occurrence, determining whether the current location is at least one of a stationary state and a boundary state, and carrying out the other steps if the current location is at least one of a stationary state or a boundary state.

In another aspect of Applicants' invention, a method of determining regular patterns in movements of a mobile terminal includes the steps of (a) determining whether a current location of the mobile terminal is one of a stationary state and a boundary state; (b) marking a sequence of locations comprising the current location, one of the most recent previous stationary state and the most recent previous boundary state, and previous locations that occurred between the one of the most recent previous stationary state and the most recent previous boundary state; (c) comparing the marked sequence to each of a plurality of stored sequences of locations and determining at least one quantitative measure of a degree of matching between the marked sequence and each stored sequence; and (d) if the at least one quantitative measure exceeds a predetermined value, increasing a priority parameter of the respective stored sequence by a predetermined amount.

Such a method may further include the step of storing the current location in a queue of a plurality of the previous locations, the locations being stored in the queue in first-in-first-out order of occurrence, and carrying out the other steps if the current location is at least one of a stationary state and a boundary state.

In such methods, the plurality of stored sequences may include movement circles and movement tracks, and the one of the stored sequences may be selected based on a ratio of a number of locations in the current or marked sequence that are the same as locations in a stored sequence and a total number of locations in the current or marked sequence. Also, the one of the stored sequences may be selected based on a quantitative measure of a degree that a duration of the current or marked sequence matches a duration of each stored sequence and on a quantitative measure of a degree that a frequency of the current or marked sequence matches a frequency of each stored sequence.

In other aspects of Applicants' invention, an apparatus for predicting a next location of a mobile terminal based on previous locations of the mobile terminal, and apparatus for determining regular patterns in movements of a mobile terminal are provided.

For example, an apparatus for predicting a next location of a mobile terminal based on previous locations of the mobile terminal includes a memory for storing sequences of previous locations of the mobile terminal, and a device, in communication with the memory, for comparing a current sequence that includes the current location of the mobile terminal and a plurality of previous locations of the mobile terminal to each of a plurality of stored sequences. The apparatus further includes a device for selecting one of the stored sequences based on at least one quantitative measure of a degree of matching between the current sequence and each stored sequence, and a device for generating a prediction of the next location of the mobile terminal based on the selected one of the stored sequences.

In such an apparatus, the plurality of stored sequences may include movement circles and movement tracks, and the selecting device may include a device for determining a ratio of a number of locations in the current sequence that are the same as locations in a stored sequence and a total number of locations in the current sequence. One of the stored sequences is selected based on the ratio. The selecting device may further include a device for generating a second quantitative measure of a degree that a duration of the current sequence matches a duration of each stored sequence, and a device for generating a third quantitative measure of a degree that a frequency of the current sequence matches a frequency of each stored sequence. The one of the stored sequences may be selected based on the ratio and the second quantitative measure or on the ratio, the second quantitative measure, and the third quantitative measure.

In yet another aspect of Applicants' invention, a communication network comprises a plurality of servers, the servers being positioned in respective geographical areas and organized in a distributed file system; a mobile terminal having a device for communicating with the server nearest the mobile terminal, wherein the communicating device accesses application files and data files stored in the servers; and a mobile distributed system platform having a device for controlling the distributed file system of the servers and a device for predicting a next location of a mobile terminal, wherein the controlling device distributes location sensitive information among the servers based on a next location predicted by the predicting device.

BRIEF DESCRIPTION OF THE DRAWINGS

The features and advantages of Applicants' invention will be understood by reading this description in conjunction with the drawings, in which:

FIG. 5 illustrates how a user moves through various states that are grouped in movement circles;

FIG. 6 illustrates how states are grouped in movement tracks;

DETAILED DESCRIPTION

Most people, including the majority of mobile terminal users, have regular patterns of movement that they follow more or less every day of the week. Applicants' invention uses this regularity in everyone's movements to predict one's next location. For example, if a mobile user is on the way out of an area covered by a picocell (or a microcell), the mobile (or the network) can predict this change of location and inform the network to prefetch data, if necessary.

Using Applicants' invention, a mobile terminal or the communication network can predict the mobile's itinerary and take appropriate actions before the mobile reaches a new location. Such predictions can also be used for dynamic channel allocation, mobile terminal location, and call handoffs from channel to channel, either intra-cell or inter-cell, inter-layer or intra-layer. The predictions can be inputs to a locating algorithm, which generates a list of candidate communication channels for handover or assignment of a connection. As used in this application, the term "mobile terminal" will be understood to encompass mobile telephones, portable computers, mobiletexts, personal digital assistants, and like devices.

Figure 1:
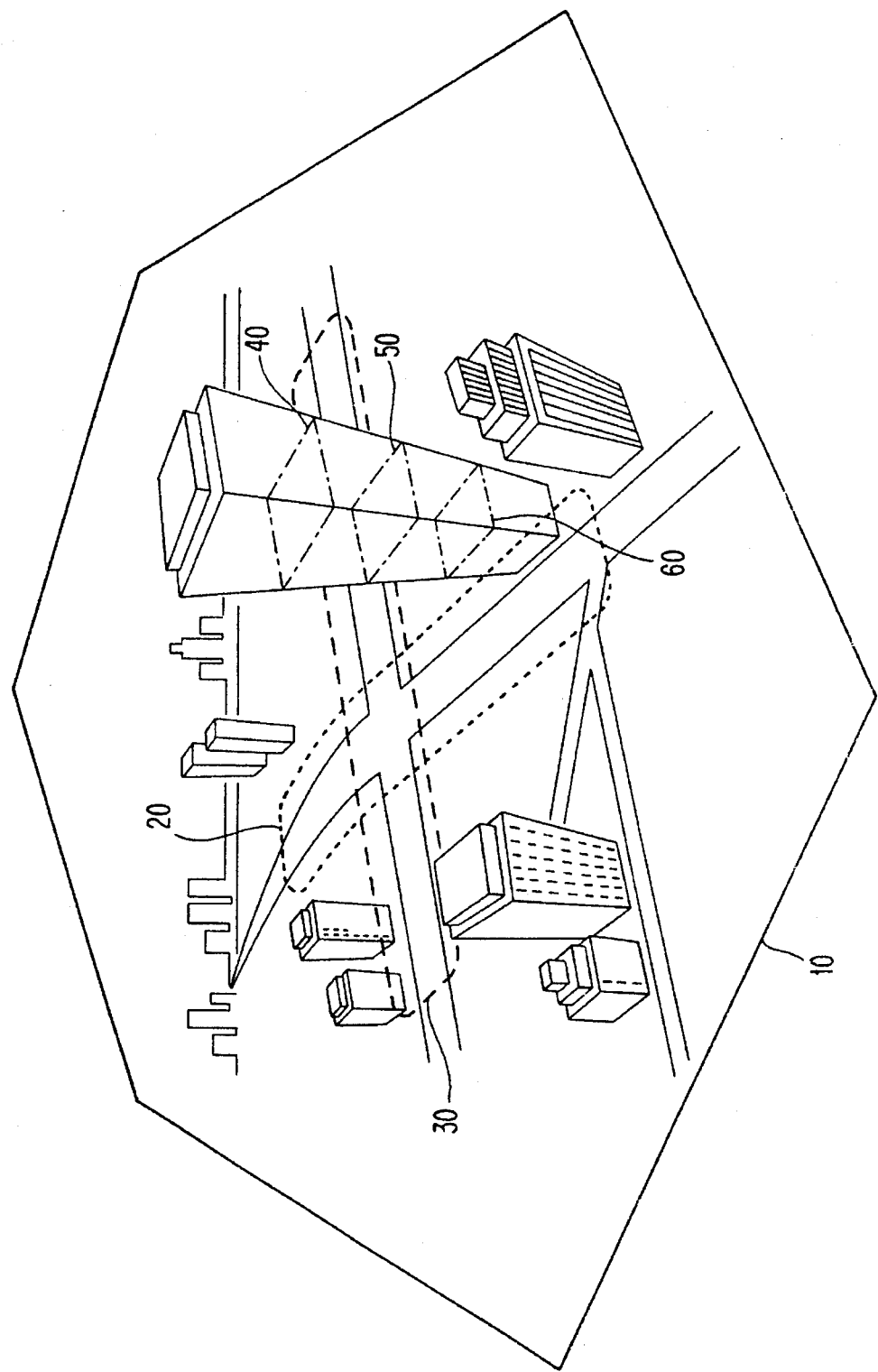
FIG. 1 is an exemplary hierarchical, or multi-layered, cellular system.

FIG. 1 is an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

Figure 2:
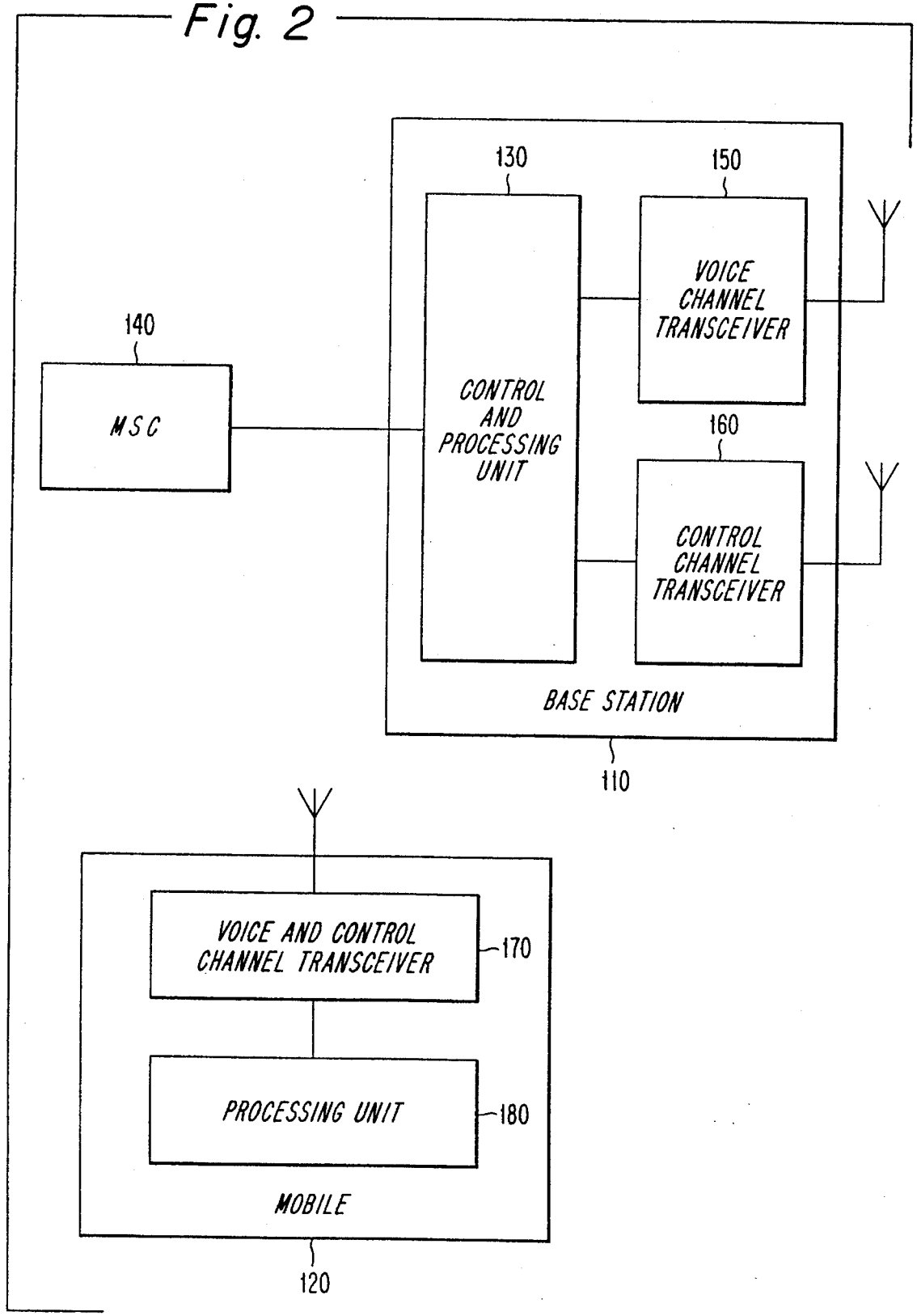
FIG. 2 is a block diagram of an exemplary cellular mobile radiotelephone system, including an exemplary base station and mobile station.

FIG. 2 represents a block diagram of an exemplary cellular mobile radiotelephone system, including an exemplary base station 110 and mobile station 120. The base station includes a control and processing unit 130 which is connected to a mobile switching center (MSC) 140 which in turn is connected to a public switched telephone network (PSTN) (not shown). General aspects of such cellular radiotelephone systems are known in the art, as described for example by U.S. Pat. No. 5,175,867 to Wejke et al., entitled "Neighbor Assisted Handoff in a Cellular Communication System", and U.S. patent application Ser. No. 07/967,027 entitled "Multi-mode Signal Processing", which was filed on Oct. 27, 1992, both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with digital control and traffic channels that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System", which is incorporated in this application by reference.

Figure 3:
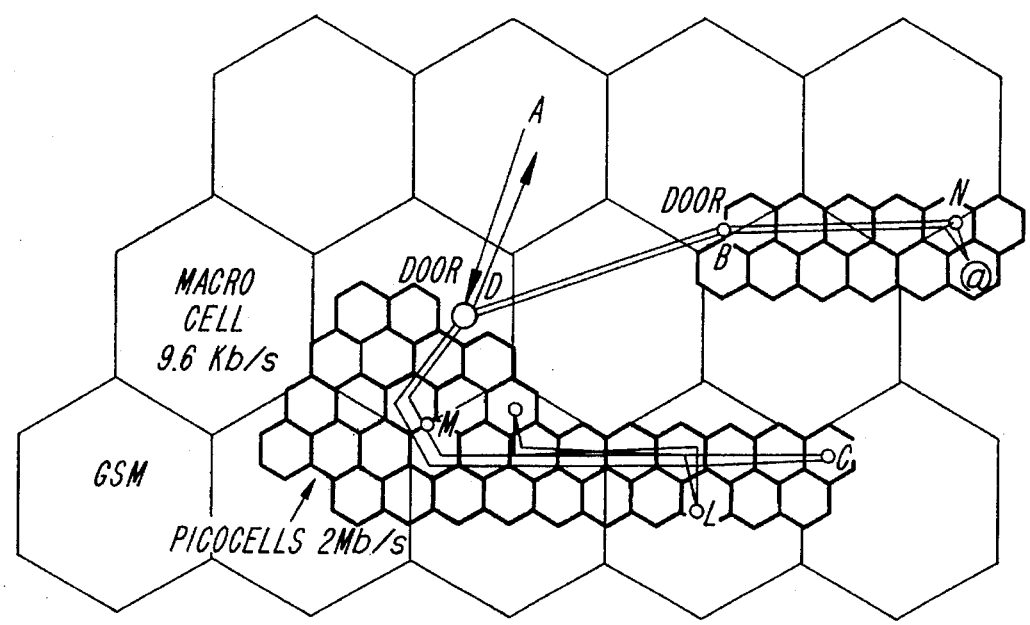
FIG. 3 is an illustration of mobile motion in a hierarchical communication system.

An example of a mobile terminal's movement pattern is shown in FIG. 3. A mobile user A moves through an area covered by a hierarchical cell architecture, which includes a picocell system having 2 Mb/s communication bandwidth and a macrocell system, such as a GSM system, having a bandwidth of 9.6 Kb/s for data transmission. The user A entered one of the picocell-covered areas through door D, and moved about inside the picocell-covered area (which may be inside a building) for a period of time. The user A entered room L, moved to conference room C, and then left the first picocell-covered area through the door D, entering the macrocell-covered area, as shown in the figure. The user A moved through the macrocell-covered area to another picocell-covered area, entering through another door B and moving about within that area.

In accordance with one aspect of Applicants' invention, user A's itinerary would be recorded as it happens by a Mobile Motion Predictor (MMP) in user A's mobile terminal or in the network. When user A moves with a certain velocity to the point M from room C or room L, the MMP would indicate a high probability that user A will move out of the high-bandwidth, picocell-covered area. The MMP would inform other systems and applications to take appropriate action, such as dynamic channel allocation and data prefetching, if necessary, before user A is out.

Figure 4:
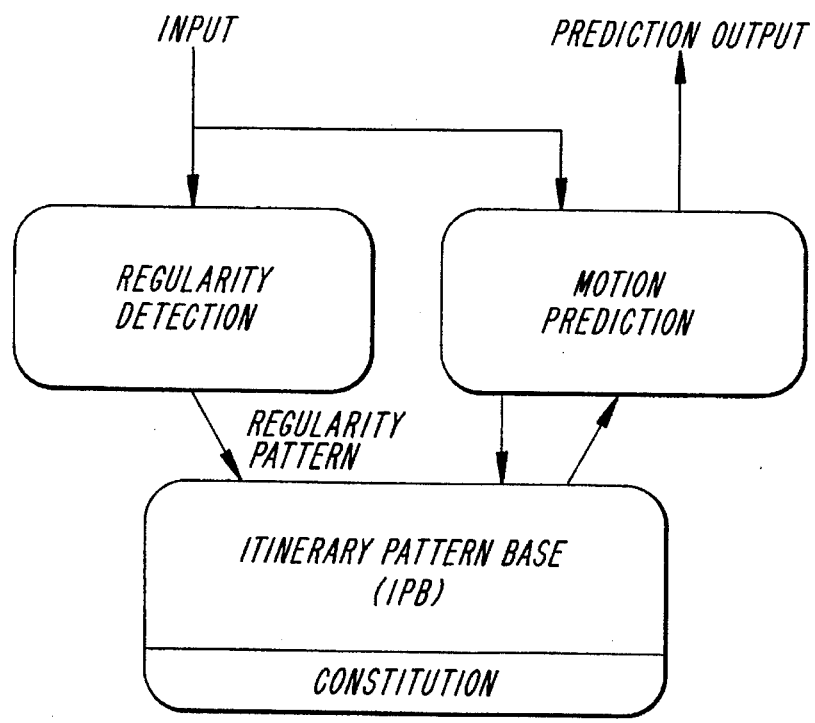
FIG. 4 illustrates Applicants' mobile motion predictor MMP.

As illustrated by FIG. 4, Applicants' MMP comprises an itinerary pattern detector IPD, an itinerary pattern database IPB, and a motion predictor MP. The IPD is used for detecting the regular itinerary patterns (IPs) in a user's movements between locations, or states, and for saving the IPs into an itinerary pattern database (IPB). In general, the IPB also includes predetermined information relating to the constitution, or physical structure, of the communication system, as described in more detail below. The MP uses the itinerary pattern information stored in the IPB for predicting the next location, or state, of the user. The MP also compares its predictions to the actual next-states of the user and updates the IPs stored in the IPB.

The input data provided to the MMP are the IAs, or states, in which the mobile is located, and it is currently believed that the system should continually check for a new state with a predetermined period, e.g., every 1–5 seconds. It will be appreciated that the IAs identify the locations of the mobile, i.e., the cells where the mobile has been and is located. Thus, the IAs can have any suitable form, such as code numbers in a Code Division Multiple Access (CDMA) communication system, or cell locations in a Time Division Multiple Access (TDMA) communication system like the GSM system used in Europe and the AMPS system used in North America. The itinerary patterns, or sequences of IAs, are stored in the IPB, which is accessed by the motion predictor MP.

Three classes of matching schemes are used for correlation analysis of MCs or MTs. First-class matching, or state-matching, indicates the degree that a sequence of states matches another sequence of states having a similar length; it is quantified by a first-class matching index that is described below. Second-class matching, or velocity- or time-matching, indicates the degree that the duration of a sequence of states matches the duration of another sequence of states having a similar length; it is quantified by a second-class matching index that is described below. Third-class matching, or frequency-matching, indicates the degree that the frequency of a sequence of states matches the frequency of another sequence of states having a similar length; it is quantified by the third-class matching index that is described below.

Before describing Applicants' invention in more detail, it will be helpful to note the following concepts and abbreviations.

boundary MC (BMC): a movement circle (MC) in which at least one state is a boundary state; a BMC has a higher priority than an MC, with a boundary priority parameter $\beta$.

boundary MT (BMT): a movement track (MT) in which at least one state is a boundary state; a BMT has a higher priority than an MT, with the boundary priority parameter $\beta$.

boundary state (BS): a state at the boundary of a cell layer.

FIFO: first in, first out.

forked state (FS): a joint state for which the following states are in distinguishable movement circles.

identity area (IA): a cell or group of cells sending (broadcasting) identified information to an area covered by the cell or group of cells.

itinerary pattern base (IPB): an information database including a maximum number M of itinerary patterns.

joint state (JS): a state included in at least two distinguishable movement circles.

LRU: least recently used.

movement circle (MC): a circle having n (where n>1) sequential states including at least one stationary state.

movement track (MT): a track that begins and ends with a stationary state or a boundary state.

pointer state (PS): a state in a state-queue that contains a pointer pointing to a saved MC or MT in an IPB.

$\rho$: the priority parameter, indicating the priority of an MC or MT.

state (S): a user location, i.e., an identity area IA, in a movement pattern (or motion graph), where $S_{k,t}$ indicates state k at time t (current time).

state queue (SQ): a queue of states saved in temporal order of occurrence.

stationary state (SS): a state (IA) in which a mobile terminal has stayed for at least a period of time $\tau$.

$T_{mc}$: the period of an MC, given by $t_n-t_1$, the time interval between the first and last states in the MC.

transitional state (TS): a state in which a mobile terminal has stayed for less than a period of time $\tau$.

$\tau_b$: a time criterion for identifying a BS.

$\tau_s$: a time criterion for identifying a SS.

In accordance with Applicants' invention, the IPD is grounded on two basic procedures: a movement circle (MC) model and a movement track (MT) model. The MC model addresses long-term, regular user movements, which are assumed to take the form of closed loops, or circles, of states. The MT model addresses routine movements, which are assumed to take the form of linear tracks of states.

The MC model is based on the assumption that when a user moves from a location, the user will eventually return. Thus, the movements of a mobile terminal user are modeled as different circle-like patterns, examples of which are shown in FIG. 5. The states are represented by circles identified by the numbers 1–27, 29–35 which indicate the identity areas IA corresponding to the states. From the figure, it can be seen that an MC is a closed loop, or "circle", of states having a duration $T_{mc}$ and including at least two states and at least one stationary state. Applicants' MMP determines that a state is a stationary state by applying the following criterion: if the IA signal (the input state) provided to the MMP has not changed during a predetermined period of time $\tau_s$ (e.g., $\tau_s \geq$ five minutes), then the state $S_{k,t}$ is a stationary state.

Looked at in a different way, each movement circle is a sequence of states, e.g., [1, 16, 17, 18, 21, 20, 19, 18, 1]. It will be understood that when considering a movement circle, one must move around the circle in a known direction because the order of the states may differ for different directions. Also, associated with each MC are an LRU priority parameter $\rho$, which indicates the priority of the MC with respect to other MCs in the IPB, a frequency parameter F, which indicates the frequency of the sequence of states (see FIG. 12), and a boundary priority parameter β, all of which are initialized to zero for each new MC. A "new" MC is detected by comparing an incoming MC to each of the MCs already stored in the IPB. If the new MC's first-class matching index μ, which is described in more detail below, matches the index μ of one of the stored MCs, the priority factor ρ of the stored MC is increased by 1. Otherwise, the new MC is stored in the IPB with the initial values of ρ=F=β=0. If one or more states in an MC is a boundary state, that MC is called a boundary MC and has its boundary priority parameter β increased by 1.

Applicants' MMP determines that an input state is a boundary state by applying one of the following criteria: either (1) if no input IA signals have been received for a predetermined period of time $\tau_b$ (e.g., $\tau_b \geq$ five minutes), then the state $S_{k,t-\tau b}$ is a boundary state; or (2) if no input IA signals have been received after the predetermined period of time $\tau_b$ (e.g., $\tau_b \geq$ five minutes) and a new IA signal (state $S_{k+1,t}$) has been received, then the state $S_{k+1,t}$ is a boundary state.

Using the MT model, the IPD generates movement tracks, which are itineraries that each begin and end with either a stationary state or a boundary state. In that closed loops of states are not required, the MT model is a less-constrained version of the MC model. Six examples of MTs are shown in FIG. 6 that are derived from the MCs shown in FIG. 5, and it will be noted that every MC includes at least one MT.

As with the movement circles, it will be understood that when considering a movement track, one must move along the track in a known direction because the order of the states may differ for different directions. Also, associated with each MT are the LRU priority parameter ρ, which indicates the priority of the MT with respect to other MTs, the frequency parameter F, and the boundary priority parameter β, all of which are initialized to zero for each new MT. A "new" MT is detected by comparing an incoming MT to each of the MTs already stored in the IPB. If the new MT's first-class matching index μ, which is described in more detail below, matches the index μ of one of the stored MTs, the priority parameter ρ of the stored MT is increased by 1. Otherwise, the new MT is stored in the IPB with the initial values of ρ=F=βB=0. If one or more states in an MT is a boundary state, that MT is called a boundary MT and has its boundary priority parameter β increased by 1.

Figure 7:
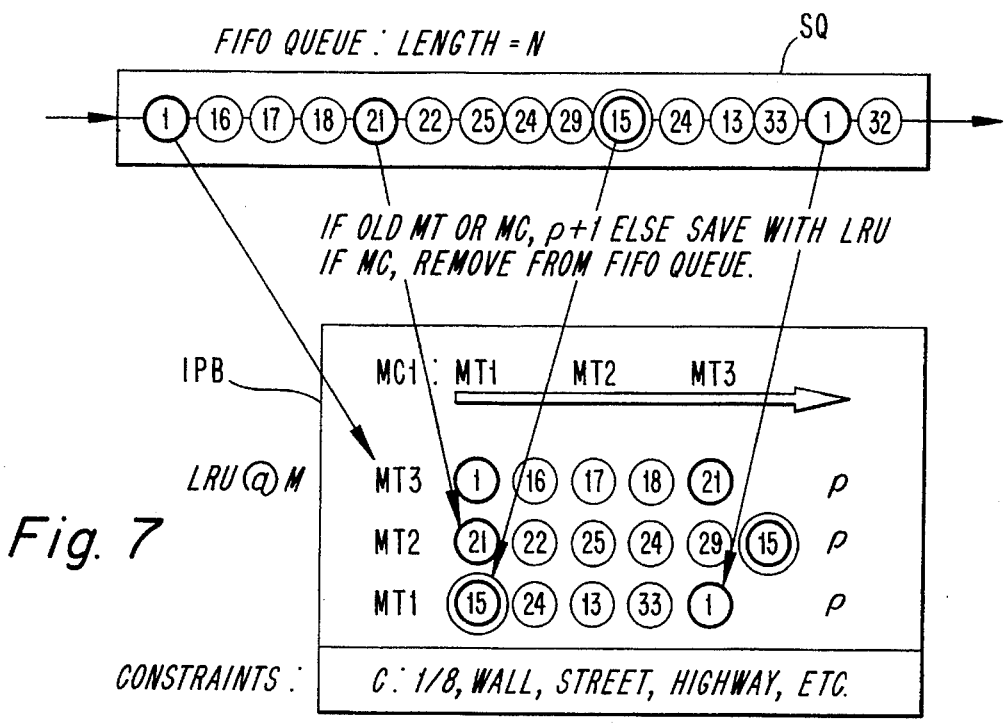
FIG. 7 illustrates the operation of an itinerary pattern detector and the data structures generated in an itinerary pattern database.

The operation of the IPD and the data structures generated in the IPB will be further understood by referring to FIG. 7, which illustrates one movement circle MC1 comprising three movement tracks MT1, MT2, MT3 stored in the IPB in least recently used (LRU) order. Also shown in FIG. 7 is a state queue SQ comprising the most recent N states provided to the MMP, stored in first-in first-out (FIFO) order (reading from left to right in the figure). The arrows indicate how the IPD transforms the sequence of states in the state queue into the MTs stored in the IPB (which do not correspond to FIGS. 5 and 6). The indication "C: ⅛, Wall, Street, Highway, etc." refers to examples of constitutional constraint states that arise from the physical construction of the communication system, which will be described in more detail below. It will be understood that the IPB and the SQ may be implemented by a wide variety of conventional electronic memory circuits.

The MC Detection (MCD) Method

Figure 8:
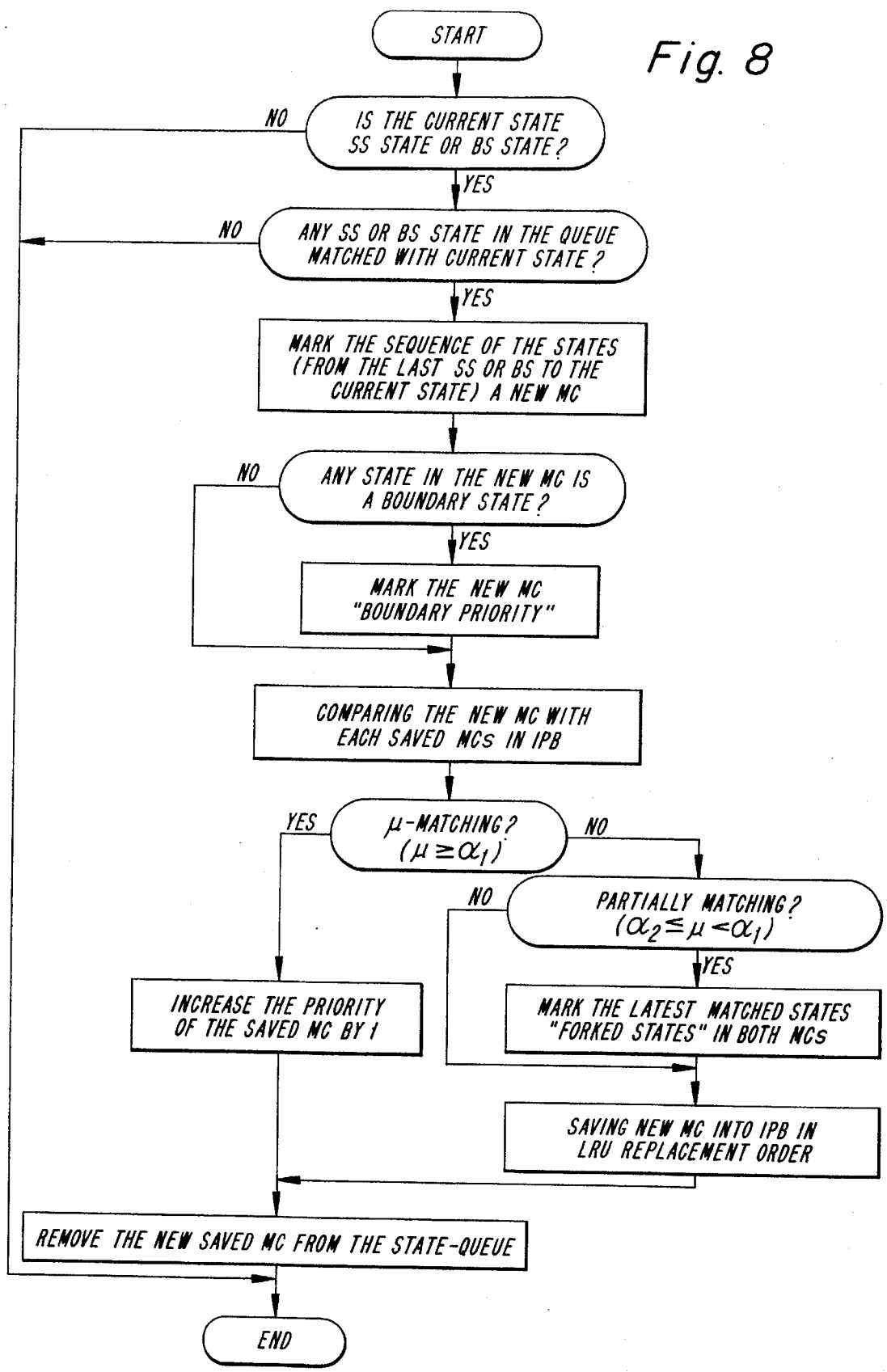
FIG. 8 is a flowchart of a movement circle detection method in accordance with Applicants' invention.

In generating itinerary patterns based on the MC model from states in the state queue, the IPD carries out a movement circle detection (MCD) method comprising the following steps, which are also illustrated in flowchart shown in FIG. 8. The MCD and methods in accordance with Applicants' invention are described in terms of C-language pseudocode, by which the methods may be implemented easily in hardware and software in any of the mobile stations, base stations, and mobile switching center of a cellular radiotelephone communication system.

Let N be the maximum number of states in the state queue SQ; let $MC_j$ be the j-th MC; and let other terms be as defined above. Keep a queue of k states (where $1 \leq k \leq N$) in a FIFO order and a number j of MCs (where $1 \leq j \leq M$) in a LRU replacement order in the IPB according to the following steps.

```
BEGIN
1)  IF S_{k,t} is a stationary state or a boundary state,
        IF FOR i = k–L to 1, if any S_{i,t} = =S_{k,t} (for any t, and for
        k–i > L) and S_{i,t} is a SS or a BS, mark the state sequence
        [S_{i,t-t1}, S_{i+1,t-t2}, . . . , S_{k,t}] as a new MC;
        ENDIF;
    ELSE GOTO END;
    ENDIF;
2)  IF any state in the new MC is a boundary state, mark the new MC
    as "boundary priority" with boundary priority parameter
    β = β + 1; ENDIF;
3)  Compare each new MC with each saved MC, i.e., each MC
    already stored in the IPB,
        IF μ ≧ α_1 (matching), then increase the priority parameter
        ρ of the saved MC by 1 and calculate the frequency
        parameter F of the saved MC;
        ELSE
        IF α_2 ≦ μ < α_1 (partially matching), then mark the latest
        matched states as "forked states" in both MCs;
        ENDIF;
        Save the new MC into the IPB in LRU-replacement order;
    ENDIF;
    Remove the sequence [S_{i,t-t1}, S_{i+1,t-t2}, . . . , S_{k,t}] from the state
    queue;
END.
```

In the foregoing, $\alpha_2$ and $\alpha_1$ are numbers such that $0 \leq \alpha_2 < \alpha_1 \leq 1$; SS are Stationary States; BS are Boundary States; L=1, 2, 3, . . . is the length (in number of states) of the shortest MC stored in the IPB; and μ is the first-class matching index. The parameter $\alpha_1$ is a confidence level that is set according to the accuracy requirements or confidence level desired; usually, $\alpha_1$ is set to 0.95, 0.975, 0.99, or the like. The parameter $\alpha_2$ is a partially-matching factor that represents the degree of matching between two sequences of states, such that $\alpha_2$= 0.3, 0.4, 0.5 . . . corresponds to 70%, 60%, 50% . . . of the states match; it is currently believed that $\alpha_2$ should be set to at least 0.5 because interesting results currently seem to be produced only when at least half the states in two sequences match. The first-class matching index μ is an indicator of the degree that a first sequence of states matches a second sequence of states having a similar length (state-matching). The index μ is given by the following expression:

$$\mu = \frac{m_s}{N_s}$$

where $m_s$ is the number of states in the sequences that match, and $N_s$ is the total number of states in each sequence.

Movement Track Detection (MTD) Method

Figure 9:
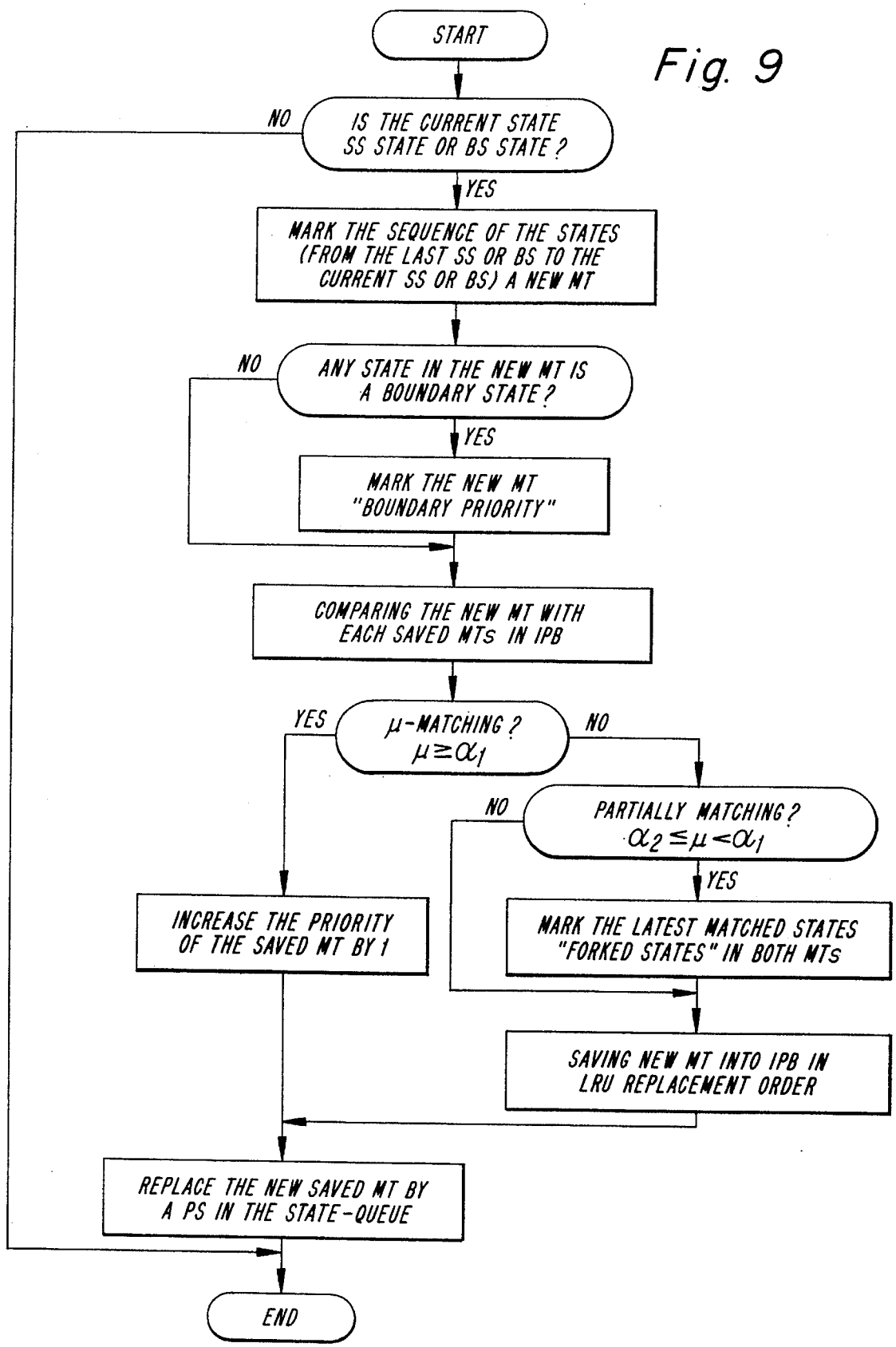
FIG. 9 is a flowchart of a movement track detection method in accordance with Applicants' invention.

In generating itinerary patterns based on the MT model, the IPD carries out a movement track detection (MTD) method comprising the following steps, which are also illustrated in flowchart shown in FIG. 9.

Let $MT_j$ be the j-th MT; let M be the maximum number of MTs in the IPB; and let other parameters be as defined above. Keep a queue of k states (where $1 \leq k \leq N$) in a FIFO order and keep a number j of MTs (where $1 \leq j \leq M$) in the IPB in LRU replacement order.

```
BEGIN
1)  IF S_{k,t} is a stationary or boundary state,
        FOR i = k-L to 1, IF S_{i,t} is a SS or BS (for any t, and for
           k-1 > L), mark the sequence [S_{i,t-t1}, S_{i+1,t-t2}, ..., S_{k,t}] as a
           new MT; ENDIF;
        ELSE GOTO END;
    ENDIF;
2)  IF any state in the new MT is a boundary state, mark the new MT
    as "boundary priority" with boundary priority parameter
    β = β + 1; ENDIF;
3)  Compare each new MT with each already saved MT,
        IF μ ≧ α_1 (matching), then increase the priority parameter
        ρ of the saved MT by 1 and calculate the frequency
        parameter F of the saved MT;
        ELSE
            IF α_2 ≦ μ < α_1 (partially matching), mark the
            latest matched states as "forked states" in both MTs;
            ENDIF;
        Save the new MT into the IPB in LRU-replacement order;
    ENDIF;
        Replace the new saved MT with a PS in the state queue;
END.
```

In the foregoing, μ is the first-class matching index; $α_2$ and $α_1$ are numbers such that $0 \leq α_2 < α_1 \leq 1$; PS is a Pointer State; L=1, 2, 3, ... is the minimum length (in number of states) of an MT. It will be noted that using a pointer state instead of another state is advantageous because it avoids duplication.

Motion Predictor

The motion predictor MP included in Applicants' MMP generates predictions of the next states of movement circles or movement tracks by using regression and correlation analysis of the current movement itinerary with the IPs stored in the IPB. In general, the output $PD_{out}$ of the MP is a future state or a sequence of future states.

Figure 10:
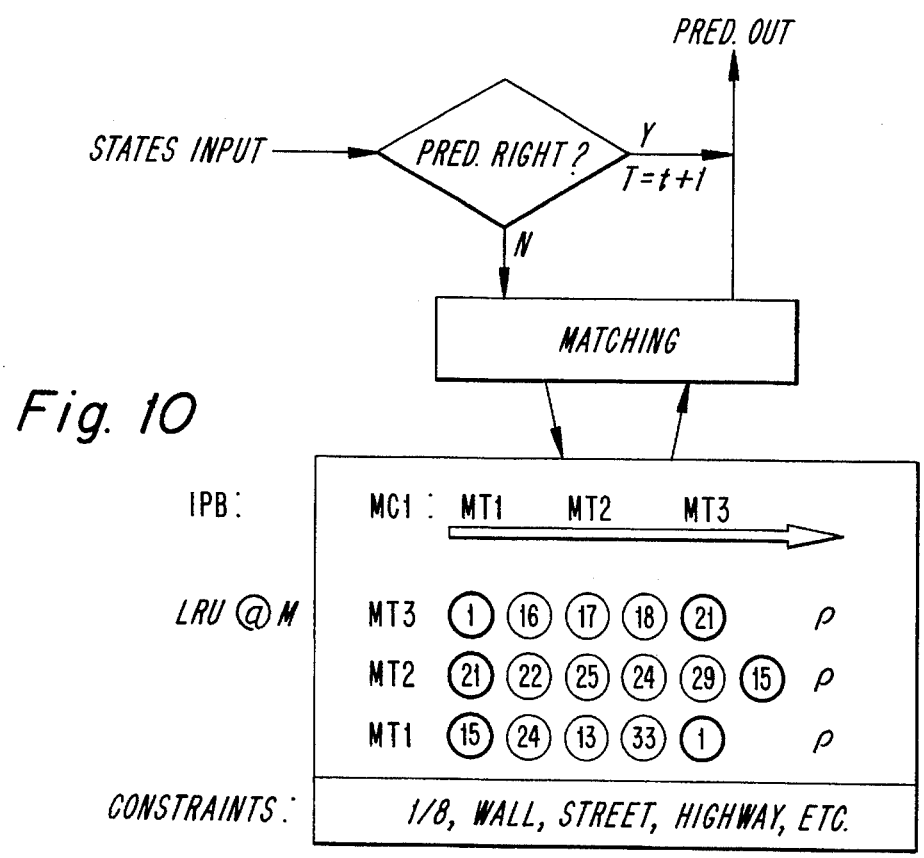
FIG. 10 illustrates the operation of a motion predictor.

FIG. 10 illustrates the operation of the MP, which includes means for comparing input states provided to the MMP to predicted states generated by the MMP and means for matching input states to IPs stored in the IPB and for generating predictions. If the comparator indicates that a prediction is right, i.e., that the current input state matches the predicted state, the prediction is provided as the output of the MMP. If the comparator indicates that the current input state does not match the prediction, or when the MMP is initialized, a motion prediction process is carried out to generate the next prediction.

Figure 11:
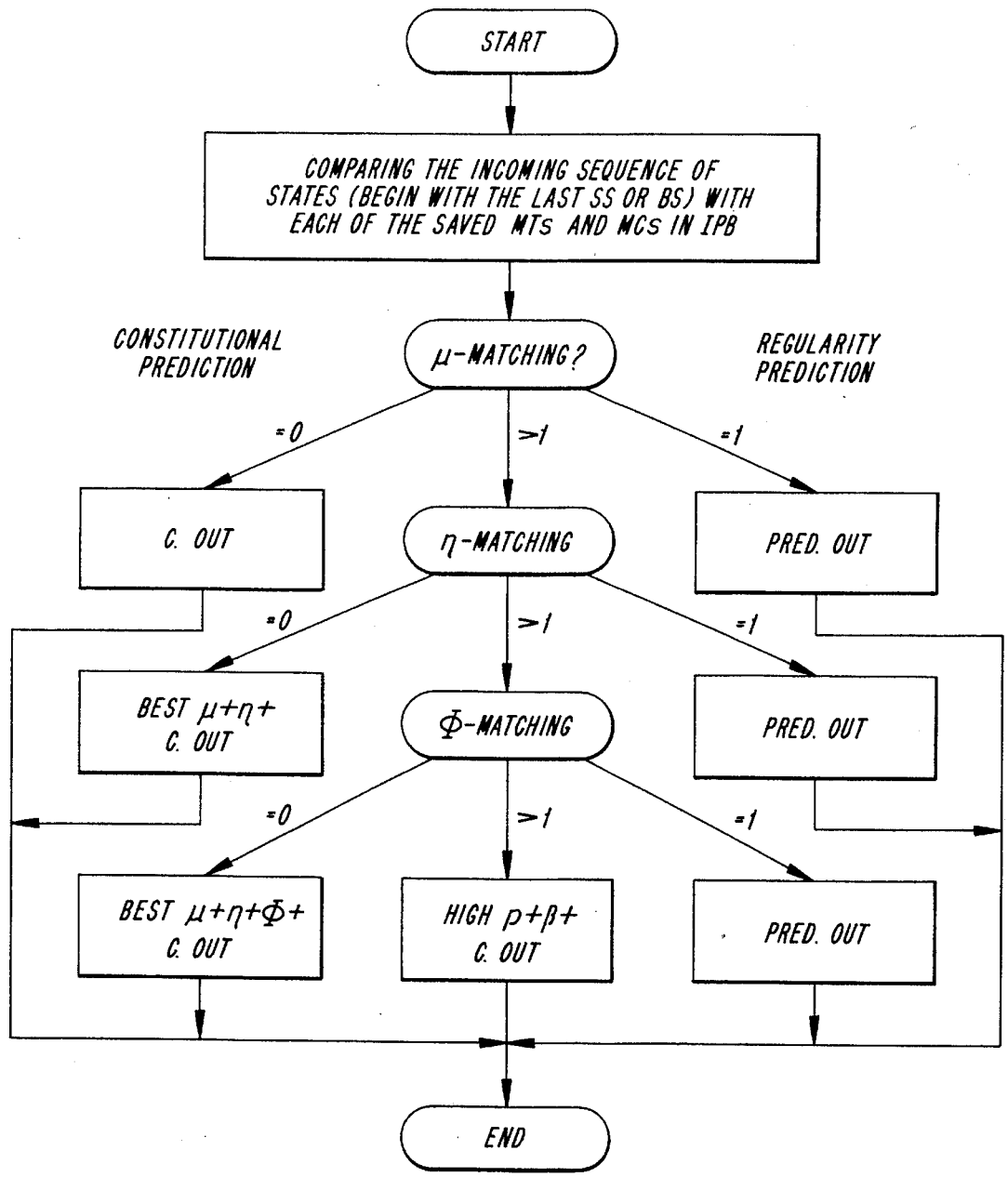
FIG. 11 illustrates the tree-like structure of a motion prediction method.

When an input state does not match the corresponding predicted state, the sequence of input states beginning with the most recent stationary state or boundary state is compared by the MP to each of the MCs and MTs stored in the IPB. This matching process determines the best-matched stored itinerary pattern, which becomes the output of the motion predictor. The motion prediction method, comprising the following steps, is advantageously structured like a tree as illustrated in FIG. 11.

Motion Prediction Method (MPM)

Let $S_{k,t}$ be the state k at time t, and let n>0, $t_i$>0, and M be the maximum number of MTs and MCs in the IPB. Keep a queue of k states (where $1 \leq k \leq N$) in a FIFO order and keep a number j of MTs and MCs (where $1 \leq j \leq M$) in the IPB in a LRU replacement order. Also, assume $PD_{out}$=[0] or $PD_{out} \neq [0]$ and $S_{k,t}$ is not matched with the first state of $PD_{out}$.

```
BEGIN
1)  FOR each new incoming state S_{k,t}, compare the new sequence
    [S_{k-n,t-tn}, S_{k-n+1,t-tn+1}, ..., S_{k,t}] with each MC and MT stored in
    the IPB, (where S_{k-n,t-tn} is the latest SS or BS, and n > 0);
2)  use first-class (μ) matching:
    IF only one stored MC or MT has fulfilled the μ-matching
    requirement with the new sequence (μ ≧ α_1), then
    PD_{out} = [S_{k+1,t+t1}, S_{k+2,t+t2}, ..., S_{k+m,t+tm}] of the matched MC or
    MT, (m > 0); GOTO END;
    ELSEIF no stored MC or MT has a μ that matches the μ of the
    new sequence, then PD_{out} = C_{out}; GOTO END;
    ELSE use second-class (η) matching; ENDIF;
3)  use second-class (η) matching:
    FOR all stored MCs or MTs having μ that μ-matched with the new
    sequence (μ ≧ α_1), (joint states), IF only one stored MC or MT
    has fulfilled the η-matching requirement with the new sequence
    (η ≦ α_3), then PD_{out} = [S_{k+1,t+t1}, S_{k+2,t+t2}, ..., S_{k+m,t+tm}] of the
    matched MC or MT, (m > 0); GOTO END;
    ELSEIF no stored MC or MT has a η that matches the η of the
    new sequence, find one having a constraint state that is best μ-
    matched and best η-matched to the new sequence; GOTO END;
    ELSE use third-class (Φ) matching; ENDIF;
4)  use third-class (Φ) matching:
    FOR all μ- and η-matched stored MCs or MTs (joint states),
    IF only one stored MC or MT has fulfilled the Φ-matching
    requirement, PD_{out} = [S_{k+1,t+t1}, S_{k+2,t+t2}, ..., S_{k+m,t+tm}] of the
    matched MC or MT, (m > 0); GOTO END;
    ELSEIF no stored MC or MT has a F that matches the F of the
    new sequence (Φ ≦ α_4), find one having a constraint state that is
    best μ-matched, best μ-matched, and best Φ-matched to the new
    sequence; GOTO END;
    ELSE (more than one stored MC or MT has a F that matches the
    F of the new sequence (Φ< α_4)), find one of the constraint states
    having the highest ρ+β,
    ENDIF;
END
```

In the foregoing, μ is the first-class matching index, η is the second-class matching index, Φ is the third-class matching index, and the other terms are as described above. Also in the foregoing procedure, have $η \leq α_3$ when η-matching, and have $Φ \leq α_4$ when Φ-matching, where $α_3$ and $α_4$ are confidence levels associated with the second- and third-class matches, respectively, which match the speeds or frequencies of two sequences of states. Because the speed or frequency of a mobile user is generally more highly variable, the values of the parameters $α_3$, $α_4$ need not be as restricted as the values of the parameters $α_1$, $α_2$. Thus, the values of $α_3$ and $α_4$ can be 0.1, 0.05, 0.025, 0.005, ..., depending on the accuracy requirements or the confidence level desired; usually, $α_3$ and $α_4$ would be set to 0.05 for the 95%-confidence level.

The second-class matching index η is an indicator of the degree that the duration (speed) of a first sequence of states matches the duration (speed) of a second sequence of states having a similar length (velocity- or time-matching). The index η is given by the following expression:

$$\eta = \frac{2 \sum_{i=1}^{N_s-1} |(t_{i+1} - t_i)_2 \leftarrow \rightarrow (t_{i+1} - t_i)_1|}{\sum_{i=1}^{N_s-1} [(t_{i+1} - t_i)_2 \oplus (t_{i+1} - t_i)_1]}$$

where: $(t_{i+1}-t_i)_1$ is the time interval between state i and state i+1 in the first sequence; $(t_{i+1}-t_i)_2$ is the time interval between state i and state i+1 in the second sequence; "⇋" is the modulo minus operator, where the modulus is 24 for time intervals measured in hours and 60 for time intervals measured in minutes; and "⊕" is the modulo plus operator, where the modulus is 24 for time intervals measured in hours and 60 for time intervals measured in minutes.

Figure 12:
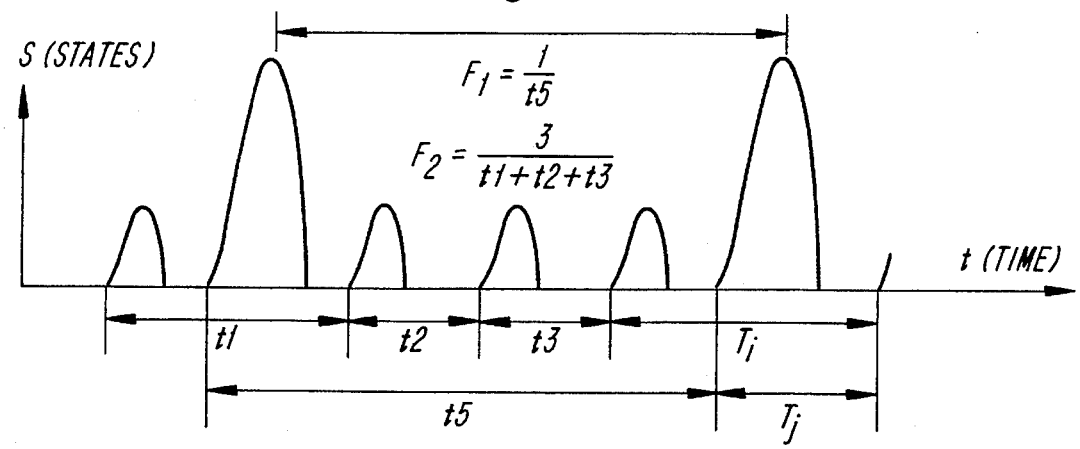
FIG. 12 illustrates an example of how a user moves through various states as a function of time.

The third-class matching index Φ is an indicator of the degree that the frequency of a first sequence of states matches the frequency of a second sequence of states having a similar length (frequency- or period-matching). Referring to FIG. 12, which illustrates how a user moves through various states (indicated on the vertical axis) as a function of time (indicated on the horizontal axis), the third-class matching index Φ is determined as follows. The six movement circles depicted in FIG. 12 can be interpreted as recurring with different frequencies $F_1$, $F_2$, where $F_1$ is the frequency of the two longer movement circles and $F_2$ is the frequency of the four shorter movement circles.

The frequency $F_k$ of an MC or an MT is given by the following expression:

$$F_k = \frac{n}{\sum_{k=1}^{n} t_k}$$

where n=ρ+1. The frequency $F_k'$ of a new incoming sequence of states is given by the following expression:

$$F_k' = \frac{1}{T_k}$$

as seen in FIG. 12. Thus, the third-class matching index Φ is given by the following expression:

$$\Phi_k = \left| \frac{\sum_{k=1}^{n} t_k}{n \cdot T_k} - 1 \right|$$

where $\Phi_k=0$ indicates exact matching. It will also be recognized that the third-class matching index Φ is given by the following expression:

$$\Phi = \left| \frac{F_1}{F_2} - 1 \right|$$

where $F_1$ is the frequency of a first one of the sequences being matched and $F_2$ is the frequency of the other sequence being matched.

Referring again to FIG. 11, if only one stored MC or MT has fulfilled the μ-matching requirement with the incoming sequence ($\mu \geq \alpha_1$), that one is provided as the prediction by the MMP. If more than one MC or MT has fulfilled the μ-matching requirement, then the second-class matching indices are examined. If only one stored MC or MT has fulfilled the η-matching requirement with the incoming sequence ($\eta > \alpha_3$), that one is provided as the prediction by the MMP. If more than one MC or MT has fulfilled the η-matching requirement, then the third-class matching indices are examined. If only one stored MC or MT has a F that matches the F of the incoming sequence, that one is provided as the prediction by the MMP. If more than one MC or MT has a F that matches, then the sequence having a constitutional constraint state with the highest priority parameter ρ is provided as the prediction by the MMP.

The constitutional constraint states used in the matching process are based on the physical construction of the communication system, which is known to the system a priori. If the MMP is implemented in a mobile station, this physical construction information can be provided to the mobile through overhead messages sent on a control channel. The basis for the constraint states is illustrated in FIGS. 13a, 13b.

Figure 13A:
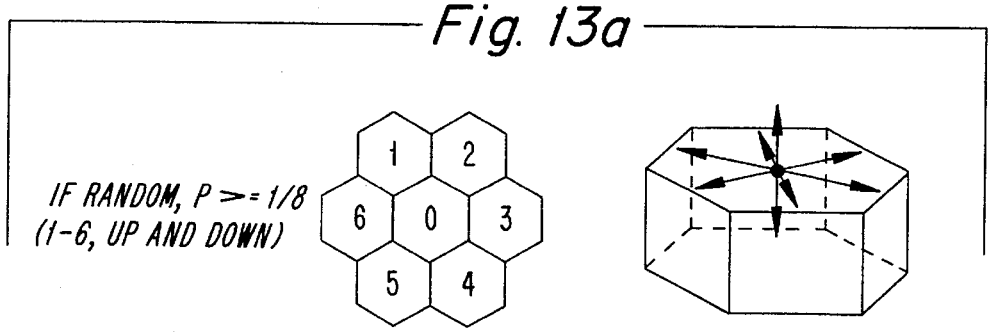
FIGS. 13a, 13b illustrate an example of constitutional constraints used in the matching process.
Figure 13B:
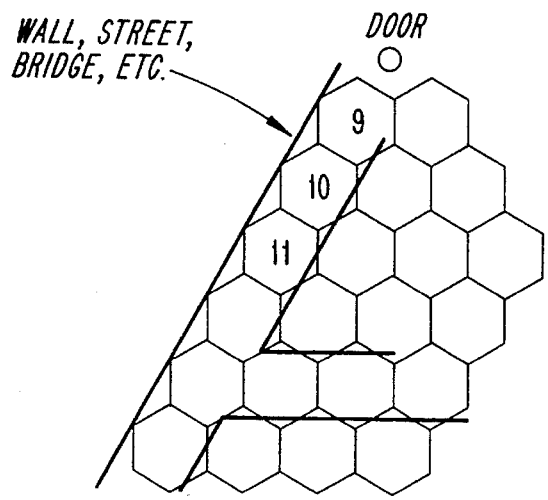

As indicated by FIG. 13a, a mobile user located in a given cell, say cell 0, can move to any one of the six adjoining cells 1–6 in the same plane and adjoining cells that might be above and below that plane; thus, in the absence of any other information, each of those eight adjoining cells may be the next state with a probability of ⅛ if the user moves uniformly randomly in all directions. FIG. 13b illustrates a physical configuration in which a door is at one end of a corridor that is also joined by another corridor. The communication system would know a priori that a mobile user in one of the corridors cannot pass through a wall of the corridor and enter one of the other cells. This information can be used to identify the constraint states.

Figure 14:
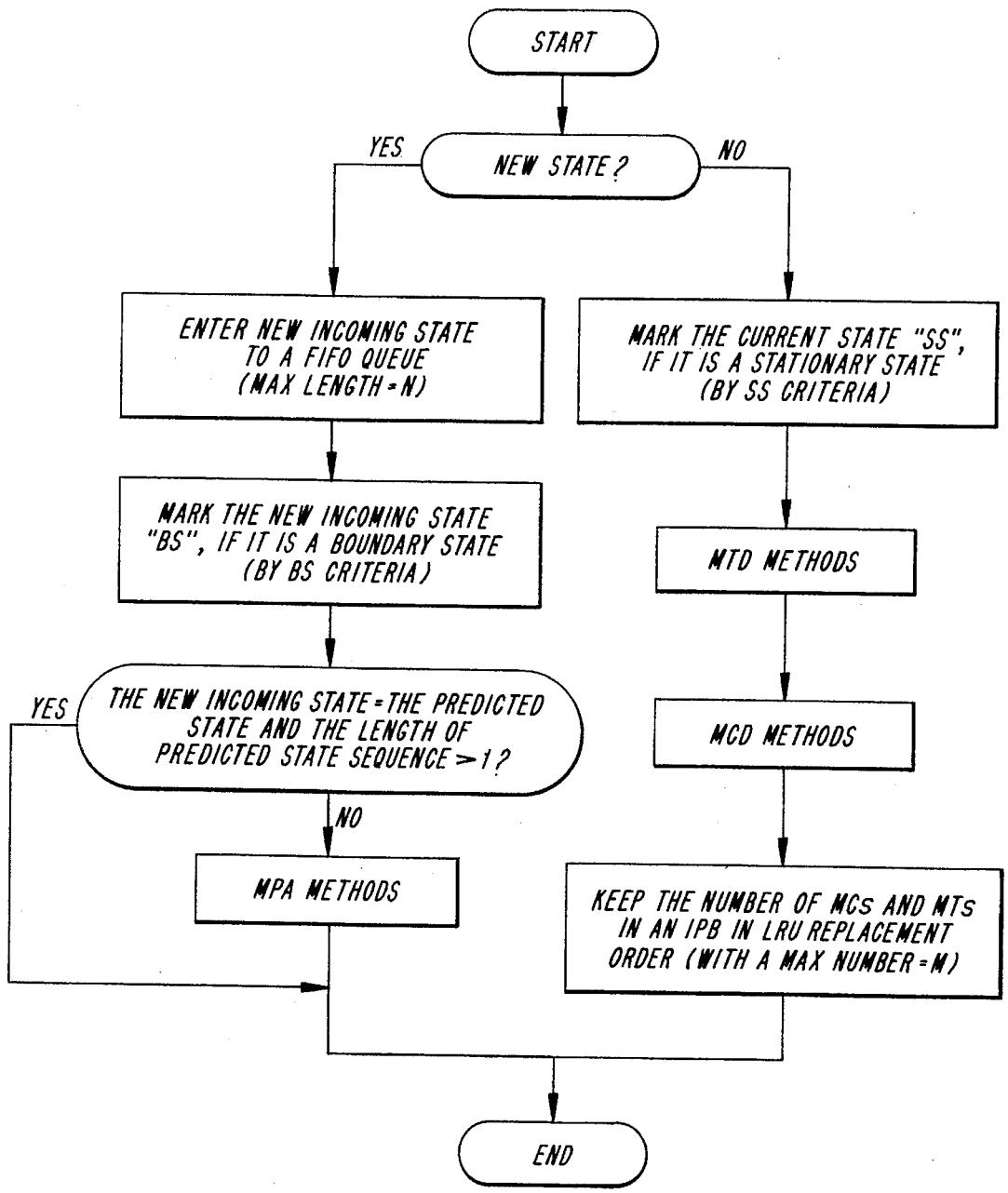
FIG. 14 is a flowchart of a mobile motion predictor in accordance with Applicants' invention.

The process carried out by Applicants' Mobile Motion Predictor MMP can now be summarized by the following pseudocode, which is illustrated in the flowchart shown in FIG. 14.

```
BEGIN
1)  IF an incoming S_{k,t} is a new state, DO steps 2), 3), 4), ELSE DO
    steps 5), 6), 7), 8), ENDIF;
2)  FOR each new incoming S_{k,t}, keep a queue of k states (where
    1 ≤ k ≤ N) in a FIFO order and mark S_{k,t} as "Boundary State"
    based on the criteria;
3)  IF the length of PD_out is greater than unity, and S_{k,t} is μ-matched
    with the first state of PD_out, PD_out = PD_out − S_{k,t}; GOTO step 9);
    ENDIF;
4)  execute motion prediction method (MPM);
5)  IF S_{k,t} = = S_{k,t−τ} (for τ ≥ τ_s), mark S_{k,t} as "Stationary State"
    based on the criterion; ENDIF;
6)  execute movement track detection (MTD) method;
7)  execute movement circle detection (MCD) method;
8)  Keep a number j of (MCs + MTs) in LRU-replacement order in
    an IPB, (where 0 ≤ j ≤ M);
9)  Repeat from step 1);
END
```

Using Applicants' invention, mobile terminals will be more intelligent in data caching and prefetching management for data communication and mobile file systems; information management, e.g., in selecting information transmission forms, etc.; and network utilization and management, e.g., in balancing network traffic and dynamic channel allocation, etc. Mobile data communication will be more user-transparent, and service quality will be better.

The operation of Applicants' MMP has been simulated, and the results of the simulation will now be described with reference to FIG. 15, which shows an example of the normalized results of a simulation of Applicants' MMP in which the number of states was 100, the length of the state queue was 500, the size of the IPB was 500, and $\lambda_0$ was 0.05. The operation of the MMP for a period of five weeks was simulated.

Figure 15:
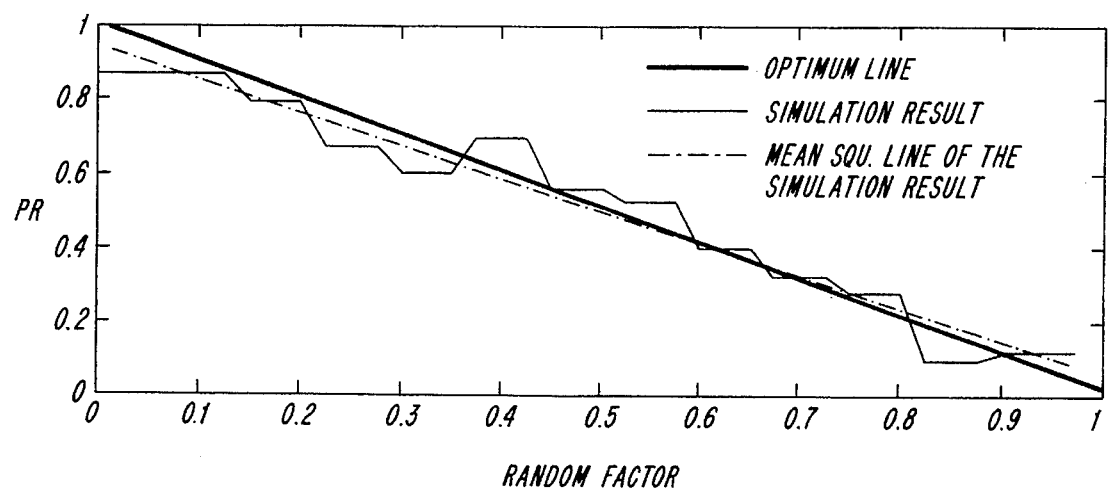
FIG. 15 shows an example of normalized results of a simulation of Applicants' mobile motion predictor.

FIG. 15 shows the relationship between a prediction ratio PR and a randomness factor. The randomness factor refers to the proportion of a movement that is due to pure chance; a randomness factor of unity means a particular movement, or transition between states, was completely random. The prediction ratio is the ratio of the number of correctly predicted states to the total number of input states; a prediction ratio of unity means every one of the MMP's state predictions is correct.

In FIG. 15, the "optimum" line is the expected best (theoretical) result, i.e., if there is a regularity factor X in a movement (i.e., the randomness factor is 1−X), then the prediction ratio is X. It can be seen from FIG. 15 that the simulated MMP results track the optimum line quite well; the dashed line in FIG. 15 shows the mean-squared simulation results. The simulated MMP's prediction efficiency, which is the ratio of the prediction ratio to the regularity factor, was about 95%.

In carrying out the simulation, a few simplifying assumptions were made that would not necessarily reflect conditions in a real-world situation. In particular, the probability of a mobile's moving from one IA to any other IA was assumed to have a uniform distribution; in other words, no constitutional constraint states were used (the constraint outputs were zero).

Also, the time intervals between consecutive states were assumed to have a Poisson distribution, which was adjusted by a daily mobility factor according to the following relationship:

$$\lambda = \lambda_0 \cdot MF$$

where $\lambda_0$ was the unadjusted density of the assumed Poisson distribution. The daily mobility factor MF took on one of three values, depending on the simulated time of day: MF=2, for times between 2000 hr and 0600 hr; MF=4, for times between 0830 hr and 1600 hr; and MF=8, for times between 0600 hr and 0830 hr and between 1600 hr and 2000 hr. This behavior of the mobility factor is believed to approximate real-world behaviors sufficiently closely.

Applicants' Mobile Motion Predictor can be employed in an aggressive mobility management scheme that may be called predictive mobility management. The MMP predicts the location where a user will be based on the user's historical movement patterns, and data and/or services are pre-connected and/or pre-assigned at the predicted location before the user gets there. In this way, the user can obtain access to his or her data and/or services at the predicted location with virtually the same efficiency as at the previous location.

To distribute network services and resources closer to mobile users, i.e., to provide service and resource mobility in wireless data networks, a Mobile Floating Agent (MFA) and a Mobile Distributed System Platform Agent (MDSPA) can be implemented with Applicants' MMP. Service mobility is defined as the mobility of various service logic in the underlying network to meet quality of service requirements of the mobile users. Resource mobility is defined as the mobility of resources, such as system data/programs, user data, user programs, etc., in the underlying network to meet quality of service requirements of the mobile users. Mobility management developed from user and terminal mobility is required for managing the service and resource mobility.

To efficiently support mobility, each user and each terminal may advantageously be represented in the network by respective agents, which contain all service logic and service data related to the user or terminal and control all communication sessions of the user or terminal. The users/terminals are connected to access nodes in the network, and the agents provide their services in serving nodes. In networks such as the GSM network in Europe, the base station controllers act as the access nodes and the MSC, with its integrated visitor location register, acts as both a serving node and a visited location. Various aspects of such intelligent networks and agents are described in L. Söderberg, "Evolving an Intelligent Architecture for Personal Telecommunication", *Ericsson Review* vol. 70, no. 4, pp. 156–171 (1993), which is incorporated here by reference.

Figure 16:
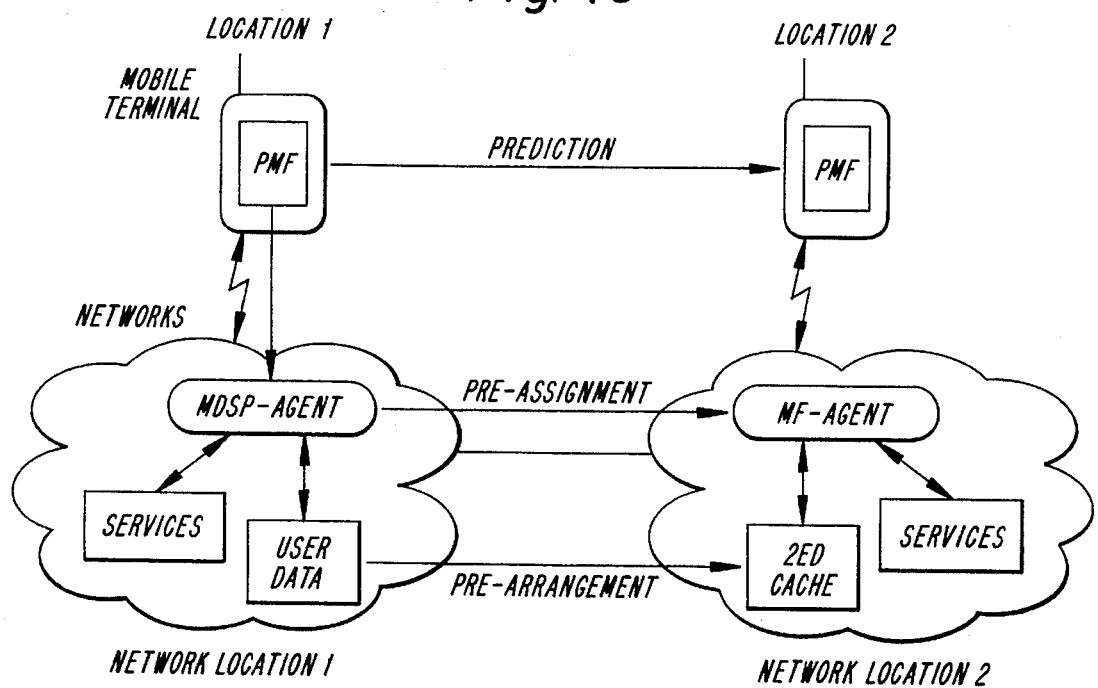
FIG. 16 illustrates a mobile floating agent and a mobile distributed system platform agent employing Applicants' mobile motion predictor.

Referring to FIG. 16, the MFA can be implemented as a process or set of processes, executing on remote fixed hosts or routers, that communicate and pre-connect with local host resources and that manage a variable replicated second class data cache on behalf of a MDSPA. A MDSPA can be implemented as a process or set of processes, executing on a home fixed host or router, that communicate and pre-assign a MFA to remote fixed hosts or routers on behalf of its mobile client user.

A Mobile Distributed System Platform (MDSP) and the MFA are designed to cope with the varying bandwidth and connectivity of different communication links at different locations and to support service and resource mobility. The MDSP typically includes Location-Sensitive Information Management (LSIM) functions and Predictive Mobility Management (PMM) functions in order to support different applications, such as mobile file systems, mobile intelligent networking, etc. In brief, the LSIM functions involve information about the services or resources (including hardware and software resources, network connectability, types of communication protocol available, etc.) provided by the systems or networks in a defined geographical area. The PMM functions involve predictions of the mobile terminal's location and Virtual-Distributed Floating Agent Assignment (FAA) functions, which assign the agent to different locations according to the location predictions and provide service pre-connection and service/resource mobility.

The LSIM in the MDSP manages the location-sensitive information and maps it to the different services offered by the mobile infrastructure at different geographical locations. Also, the LSIM informs both the applications and the agents in the mobile network supporting the applications about changes in location of a mobile terminal and provides dynamical service connections. For example, suppose a network has a distributed file system and several servers positioned in different geographic areas. If a mobile terminal were to move from a location near one of the servers to a location near another server, the LSIM would inform both the second server and the cache manager in the mobile terminal that the second server is the nearest, should a fetch of a file be required.

With the support of the MDSPA and the MFA, service logic and local resources are unbundled from the underlying network and can move around, following their mobile users. Furthermore, by using the predictive mobility management functions available with Applicants' MMP, the service logic and resources can be pre-assigned and pre-connected at the places to which a user is moving.

Also, Applicants' MMP can be employed in making connection handoffs and cell reselections more efficient. Typically, a mobile telephone, while camped on a given cell, maintains a priority list of information concerning adjacent cells to which it might camp. The mobile obtains the priority list information by scanning the control channels possible for such adjacent cells. Applicants' MMP can reduce the number of control channels that would be scanned and reduce the amount of information in the priority list by causing to be scanned only those cells that were likely candidates for the user to move into.

It is, of course, possible to embody the invention in specific forms other than those described above without departing from the spirit of the invention. The embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method of predicting a next location of a mobile terminal based on stored previous locations of the mobile terminal comprising the steps of:

comparing a current sequence that includes the current location of the mobile terminal and a plurality of previous locations of the mobile terminal to each of a plurality of stored sequences that each include previous locations of the mobile terminal;

selecting one of the stored sequences based on at least one quantitative measure of a degree of matching between the current sequence and each stored sequence; and predicting the next location of the mobile terminal based on the selected one of the stored sequences.

2. The method of claim 1, wherein the plurality of stored sequences include movement circles and movement tracks.

3. The method of claim 1, wherein one of the stored sequences is selected based on a ratio of a number of locations in the current sequence that are the same as locations in a stored sequence and a total number of locations in the current sequence.

4. The method of claim 3, wherein one of the stored sequences is selected further based on a quantitative measure of a degree that a duration of the current sequence matches a duration of each stored sequence.

5. The method of claim 4, wherein one of the stored sequences is selected further based on a quantitative measure of a degree that a frequency of the current sequence matches a frequency of each stored sequence.

6. An apparatus for predicting a next location of a mobile terminal based on previous locations of the mobile terminal comprising:

a memory for storing sequences of previous locations of the mobile terminal;

means, in communication with the memory, for comparing a current sequence that includes the current location of the mobile terminal and a plurality of previous locations of the mobile terminal to each of a plurality of stored sequences;

means for selecting one of the stored sequences based on at least one quantitative measure of a degree of matching between the current sequence and each stored sequence; and means for generating a prediction of the next location of the mobile terminal based on the selected one of the stored sequences.

7. The apparatus of claim 6, wherein the plurality of stored sequences include movement circles and movement tracks.

8. The apparatus of claim 6, wherein the selecting means includes means for determining a ratio of a number of locations in the current sequence that are the same as locations in a stored sequence and a total number of locations in the current sequence, and the one of the stored sequences is selected based on the ratio.

9. The apparatus of claim 8, wherein the selecting means further includes means for generating a second quantitative measure of a degree that a duration of the current sequence matches a duration of each stored sequence, and the one of the stored sequences is selected based on the ratio and the second quantitative measure.

10. The apparatus of claim 9, wherein the selecting means further includes means for generating a third quantitative measure of a degree that a frequency of the current sequence matches a frequency of each stored sequence, and the one of the stored sequences is selected based on the ratio, the second quantitative measure, and the third quantitative measure.

11. A method of predicting movements of a mobile terminal comprising the steps of:

(a) comparing a current sequence that includes the current location of the mobile terminal and a plurality of previous locations of the mobile terminal to each of a plurality of stored sequences that each include previous locations of the mobile terminal;

(b) determining at least one quantitative measure of a degree of matching between the current sequence and each stored sequence; and (c) if the at least one quantitative measure exceeds a predetermined value, using the locations of the respective stored sequence as predictions of the movements of the mobile terminal.

12. The method of claim 11, wherein the quantitative measure is a ratio of a number of locations in the current sequence that are the same as locations in a stored sequence and a total number of locations in the current sequence.

13. The method of claim 12, wherein step (b) further determines a first degree that a duration of the current sequence matches a duration of each stored sequence, and step (c) uses as predictions of the movements of the mobile terminal the locations of the stored sequence for which the ratio exceeds a first predetermined value and the first degree exceeds a second predetermined value.

14. The method of claim 13, wherein step (b) further determines a second degree that a frequency of the current sequence matches a frequency of each stored sequence, and step (c) uses as predictions of the movements of the mobile terminal the locations of the stored sequence for which the second degree exceeds a third predetermined value.

15. A method of determining regular patterns in movements of a mobile terminal comprising the steps of:

(a) comparing a current location of the mobile terminal to each of a plurality of previous locations stored in a queue of a plurality of previous locations, the previous locations being stored in the queue in first-in-first-out order of occurrence;

(b) if the current location matches one of the plurality of previous locations stored in the queue, marking a sequence of locations comprising the current location, the previous location that matches the current location, and the previous locations that occurred after the previous location that matches the current location;

(c) comparing the marked sequence to each of a plurality of stored sequences of locations and determining at least one quantitative measure of a degree of matching between the marked sequence and each stored sequence; and (d) if the at least one quantitative measure exceeds a predetermined value, increasing a priority parameter of the respective stored sequence by a predetermined amount.

16. The method of claim 15, further comprising the steps of:

(e) storing the current location of the mobile terminal in the queue in first-in-first-out order of occurrence;

(f) determining whether the current location is at least one of a stationary state and a boundary state; and carrying out steps (a)–(d) if the current location is at least one of a stationary state and a boundary state.

17. The method of claim 16, wherein step (c) determines a ratio of a number of locations in the marked sequence that are the same as locations in a stored sequence and a total number of locations in the marked sequence.

18. The method of claim 17, wherein step (c) further determines a degree that a duration of the marked sequence matches a duration of each stored sequence.

19. The method of claim 18, wherein step (c) further determines a degree that a frequency of the marked sequence matches a frequency of each stored sequence.

20. An apparatus for determining regular patterns in movements of a mobile terminal comprising:

a memory for storing a queue of a plurality of previous locations of the mobile terminal, the previous locations being stored in the queue in first-in-first-out order of occurrence;

first means for comparing a current location of the mobile terminal to each of the plurality of previous locations stored in the queue;

means for marking a sequence of locations comprising the current location, the previous location that matches the current location, and the previous locations that occurred after the previous location that matches the current location if the current location matches one of the plurality of previous locations stored in the queue;

second means for comparing the marked sequence to each of a plurality of stored sequences of locations and for determining at least one quantitative measure of a degree of matching between the marked sequence and each stored sequence; and means for increasing a priority parameter of the respective stored sequence by a predetermined amount when the at least one quantitative measure exceeds a predetermined value.

21. The apparatus of claim 20, wherein the current location of the mobile terminal is stored in the queue in first-in-first-out order of occurrence, and further comprising means for determining whether the current location is at least one of a stationary state and a boundary state.

22. The apparatus of claim 21, wherein the second means determines a ratio of a number of locations in the marked sequence that are the same as locations in a stored sequence and a total number of locations in the marked sequence.

23. The apparatus of claim 22, wherein the second means further determines a degree that a duration of the marked sequence matches a duration of each stored sequence.

24. The apparatus of claim 23, wherein the second means further determines a degree that a frequency of the marked sequence matches a frequency of each stored sequence.

25. A method of determining regular patterns in movements of a mobile terminal comprising the steps of:

(a) determining whether a current location of the mobile terminal is at least one of a stationary state and a boundary state;

(b) marking a sequence of locations comprising the current location, one of the most recent previous stationary state and the most recent previous boundary state, and previous locations that occurred between the one of the most recent previous stationary state and the most recent previous boundary state;

(c) comparing the marked sequence to each of a plurality of stored sequences of locations and determining at least one quantitative measure of a degree of matching between the marked sequence and each stored sequence; and (d) if the at least one quantitative measure exceeds a predetermined value, increasing a priority parameter of the respective stored sequence by a predetermined amount.

26. The method of claim 25, further comprising the step of storing the current location in a queue of a plurality of the previous locations, the locations being stored in the queue in first-in-first-out order of occurrence, and wherein steps (a)–(d) are carried out if the current location is at least one of a stationary state and a boundary state.

27. The method of claim 25, wherein a ratio of a number of locations in the marked sequence that are the same as locations in a stored sequence and a total number of locations in the marked sequence is determined.

28. The method of claim 27, wherein a degree that a duration of the marked sequence matches a duration of each stored sequence is determined.

29. The method of claim 28, wherein a degree that a frequency of the marked sequence matches a frequency of each stored sequence is determined.

30. An apparatus for determining regular patterns in movements of a mobile terminal comprising:

means for determining whether a current location of the mobile terminal is at least one of a stationary state and a boundary state;

means for marking a sequence of locations comprising the current location, one of the most recent previous stationary state and the most recent previous boundary state, and previous locations that occurred between the one of the most recent previous stationary state and the most recent previous boundary state;

means for comparing the marked sequence to each of a plurality of stored sequences of locations and for determining at least one quantitative measure of a degree of matching between the marked sequence and each stored sequence; and means for increasing a priority parameter of the respective stored sequence by a predetermined amount if the at least one quantitative measure exceeds a predetermined value.

31. The apparatus of claim 30, further comprising a memory for storing the current location in a queue of a plurality of the previous locations, the locations being stored in the queue in first-in-first-out order of occurrence.

32. The apparatus of claim 31, wherein the comparing and determining means determines a ratio of a number of locations in the marked sequence that are the same as locations in a stored sequence and a total number of locations in the marked sequence.

33. The apparatus of claim 32, wherein the comparing and determining means determines a degree that a duration of the marked sequence matches a duration of each stored sequence.

34. The apparatus of claim 33, wherein the comparing and determining means determines a degree that a frequency of the marked sequence matches a frequency of each stored sequence.

35. In a cellular radiotelephone system having a plurality of base stations and a mobile terminal, each base station transmitting respective control information on a respective control channel, an apparatus for prioritizing the base stations for a connection between the mobile terminal and a base station comprising:

means for predicting next locations of the mobile terminal based on previous locations of the mobile terminal, wherein the predicting means includes:

a memory for storing sequences of previous locations of the mobile terminal;

means, in communication with the memory, for comparing a current sequence that includes the current location of the mobile terminal and a plurality of previous locations of the mobile terminal to each of a plurality of stored sequences;

means for selecting one of the stored sequences based on at least one quantitative measure of a degree of matching between the current sequence and each stored sequence; and means for generating predictions of the next locations of the mobile terminal based on the selected one of the stored sequences; and means for scanning the control channels of a plurality of the base stations and for maintaining a priority list of information concerning the scanned control channels;

wherein the scanning means scans the control channels based on the predictions generated by the predicting means.

* * * * *

UNITED STATES PATENT AND TRADEMARK OFFICE
CERTIFICATE OF CORRECTION

PATENT NO. : 5,572,221

DATED : Nov. 5, 1996

INVENTOR(S) : Marlevi et al.

It is certified that error appears in the above-identified patent and that said Letters Patent is hereby corrected as shown below:

On title page, item [75], correct the spelling of the first inventor's given name from "Alexander" to --Aleksander--.

Signed and Sealed this

Nineteenth Day of May, 1998

*Attest:*

BRUCE LEHMAN

*Attesting Officer*  *Commissioner of Patents and Trademarks*